United States Patent
Tabata et al.

(10) Patent No.: US 7,632,470 B2
(45) Date of Patent: *Dec. 15, 2009

(54) MICROSTRUCTURE, MICROREACTOR, MICRO HEAT EXCHANGER AND METHOD FOR FABRICATING MICROSTRUCTURE

(75) Inventors: Kazuaki Tabata, Ebina (JP); Takayuki Yamada, Ebina (JP); Mutsuya Takahashi, Ebina (JP); Yoshihisa Yamazaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 421 days.

This patent is subject to a terminal disclaimer.

(21) Appl. No.: 11/206,111

(22) Filed: Aug. 18, 2005

(65) Prior Publication Data

US 2006/0140829 A1 Jun. 29, 2006

(30) Foreign Application Priority Data

Dec. 28, 2004 (JP) ............................ P2004-382121

(51) Int. Cl.
*B01J 19/00* (2006.01)
*B01J 10/00* (2006.01)

(52) U.S. Cl. ........................ 422/130; 422/188; 422/189; 422/193; 422/198

(58) Field of Classification Search ................. 422/130, 422/188, 189, 193, 198
See application file for complete search history.

(56) References Cited

U.S. PATENT DOCUMENTS

| | | | |
|---|---|---|---|
| 5,534,328 A | 7/1996 | Ashmead et al. | |
| 5,641,400 A | 6/1997 | Kaltenbach et al. | |
| 6,176,962 B1 * | 1/2001 | Soane et al. | 156/292 |
| 6,537,506 B1 | 3/2003 | Schwalbe et al. | |
| 6,814,846 B1 * | 11/2004 | Berndt | 204/601 |
| 6,821,449 B2 | 11/2004 | Caplen et al. | |
| 6,821,898 B2 | 11/2004 | Beebe et al. | |
| 7,118,917 B2 * | 10/2006 | Bergh et al. | 436/37 |
| 2001/0029781 A1 * | 10/2001 | Tai et al. | 73/204.26 |
| 2002/0094303 A1 * | 7/2002 | Yamamoto et al. | 422/100 |
| 2002/0127149 A1 * | 9/2002 | Dubrow et al. | 422/102 |

(Continued)

FOREIGN PATENT DOCUMENTS

EP 1 561 723 A1 8/2005

(Continued)

OTHER PUBLICATIONS

Toshihiro Itoh; Hironao Okada; Hideki Takagi; Ryutaro Maeda; Tadatomo Suga, Room Temperature Vacuum Sealing Using Surface Activated Bonding Method, Jun. 8-12, 2003, The 12$^{th}$ Internation Conference on Solid State Sensors, Actuators and Microsystems, pp. 1828-1831.*

(Continued)

*Primary Examiner*—Walter D Griffin
*Assistant Examiner*—Natasha Young
(74) *Attorney, Agent, or Firm*—Oliff & Berridge, PLC

(57) ABSTRACT

A microstructure includes first and second plates. The first plate defines a recess. The second plate is bonded to the first plate to block an opening of the recess to thereby form a closed vacuum space or a closed space filled with inert gas.

16 Claims, 7 Drawing Sheets

U.S. PATENT DOCUMENTS

2005/0106078 A1    5/2005  Kitamori et al.
2005/0129580 A1*   6/2005  Swinehart et al. .......... 422/100
2006/0159601 A1*   7/2006  Yamada et al. ............. 422/198

FOREIGN PATENT DOCUMENTS

| JP | A 2002-058470 | 2/2002 |
| JP | A 2002-326963 | 11/2002 |
| WO | WO 99/19717 * | 4/1999 |
| WO | WO 2004/046018 A1 | 6/2004 |

OTHER PUBLICATIONS

U.S. Appl. No. 11/206,100, filed Aug. 18, 2005, Yamada et al.
U.S. Appl. No. 11/206,100, filed Aug. 18, 2005, Tabata et al.

* cited by examiner

MICROSTRUCTURE, MICROREACTOR, MICRO HEAT EXCHANGER AND METHOD FOR FABRICATING MICROSTRUCTURE

BACKGROUND OF THE INVENTION

1. Field of the Invention

The invention relates to a microstructure, a microreactor and a micro heat exchanger, which are produced by a layer manufacturing technology, and a method for fabricating the microstructure. Particularly, the invention relates to a microstructure, a microreactor accurately and a micro heat exchanger, which can be easily produced and are capable of controlling the temperature of a specific portion, and a method for fabricating the microstructure.

2. Description of the Related Art

In the field of manufacturing industry, a layer manufacturing technology has been recently spread rapidly as a method for forming a computer-designed complex three-dimensional object in a short time. In most cases, the layer manufacturing technology has been applied to relatively large parts with a size not smaller than the order of cm. In recent years, this method has been also applied to microstructures formed by high-precision processing, such as micro-gears, micro-optical parts, microfluidic devices, etc.

Microfluidic devices are devices called "micro fabricated devices", "lab on a chips" or "micro total analytical systems (μ-TAS)". A Microfluidic device can be integrated with another microfluidic device having another function such as synthesis, physicochemical treatment, detection, etc. to construct a microchemical system. Because the microfluidic devices are excellent in uniformity of reactant temperature and good in temperature following response, it is possible to shorten reaction time and save the amount of a sample and the amount of a solvent used. Accordingly, because resources and energy required for production of a device can be saved, the microfluidic devices have merits in energy conservation in operation, reduction in the amount of waste, etc. There is expectation that the microfluidic devices will be developed in the future.

A microreactor provided as a kind of microfluidic device is a device having a micro reaction field smaller by several digits than that of an ordinary macroscopic reactor. In most cases, the microreactor uses a channel having a diameter of from 1 mm to the order of micros as the reaction field. Accordingly, the microreactor is also referred to as "microchannel reactor". It is considered that temperature control can be performed accurately on the basis of reduction in heat capacity because the device surface area per unit volume of such a microreactor is large. Researches into the microreactor have been advanced in various countries because the microreactor is a device particularly having an appeal for catalytic reaction sensitive to temperature and having a reaction speed dependent on the contact area.

The microreactor has characteristic in that fluid in the microreactor behaves in different ways from those of conventional fluid because surface tension, viscous force and friction based on the size of the microreactor become relatively large compared with the gravity and inertia of fluid. One of the reasons is in that a flow in a channel is a laminar flow. Although the laminar flow field has a disadvantage that liquids are hardly mixed with one another compared with the turbulent flow, the laminar flow has an advantage that a flow field having a novel function which could not be achieved by a macro apparatus can be created in accordance with design (e.g. see JP 2002-326963 A).

On the other hand, there are a lot of problems to be solved. One of the problems is that it is difficult to inject a sample quantitatively because the internal volume of the microfluidic device is too few. Accordingly, it is difficult to scale down the conventional chemical reaction simply, so that mismatch occurs in man-machine interfaces. Because the reaction portion is so small that the amount of a synthesized product per cycle becomes small, measures to scale up the chemical reaction on the basis of parallel operation are required for an industrially large amount of synthesized products.

In most case of industrial use with microreactor a plurality of reactions are required for obtaining a product to be finally synthesized. Therefore, the microreactor is designed so that a plurality of chemical reaction paths is formed on a substrate to thereby obtain a target reaction product. In the background-art microreactor having this configuration, there is the case where this attempt is often achieved by provision of a heater or a peltier device in a portion which needs temperature control (e.g. see JP 2002-58470 A (paragraph 0029)).

There has been known a method for fabricating a Microfluidic device in which the process of coating a substrate with a resin layer and laser-machining the resin layer to form a channel is repeated to build up channels three-dimensionally (e.g. see AU 2003280800 A1.

SUMMARY OF THE INVENTION

The temperature control mechanism as described in JP 2002-58470 A, however, has a disadvantage that heat capacity is low and heat conductivity is high. When the reactor is formed as an integrated module, heat conduction occurs in the whole of the reactor even in the case where the reactor is partially heated or cooled. As a result, this exerts a bad influence on the other reaction portions. Particularly when a channel is bent two-dimensionally, a temperature difference is generated between the center portion and the outer circumferential portion because heat is hardly radiated from the center portion. It is not efficient to arrange a heater or a peltier element in each reaction portion to control the temperature of the portion to thereby eliminate the temperature difference. There is a problem that the merit of the microreactor is reduced.

FIG. 8 is a view showing this problem. If a microreactor 100 used for chemical reaction when low-temperature reaction in a low-temperature side section 104 is to be achieved following exothermic reaction in a high-temperature side section 103, it is very difficult to control the temperature because heat of reaction generated in the high-temperature side section 103 is transferred to the portion of the low-temperature side section 104 as the high-temperature side section 103 and the low-temperature side section 104 are close to each other. Moreover, there arises a problem that the temperature of the inside of the microreactor 100 is changed widely by a slight heat disturbance because the temperature sensitivity of the microreactor 100 to the heat disturbance is high.

In the microfluidic device described in AU 2003280800 A1, there arises a problem that it is not easy to produce the microfluidic device because the process of coating the substrate with the resin layer and laser-machining the resin layer to form a channel must be repeated.

Accordingly, the invention provides a microstructure, a microreactor and a micro heat exchanger, which can be produced easily and are capable of controlling the temperature of a specific portion accurately, and a method for fabricating the microstructure.

According to one embodiment of the invention, a microstructure includes first and second thin plates. The first plate defines a recess. The second thin plate is bonded to the first thin plate to block an opening of the recess to thereby form a closed vacuum space or a closed space filled with inert gas.

The closed space is kept vacuum or filled with inert gas to thereby exhibit a heat-insulating function. As a result, heat is insulated from a specific portion so that the temperature of the specific portion can be controlled. The specific portion may be located in the inside of the microstructure or in the front surface of the microstructure.

The first thin plate may be provided as one sheet or may be provided as a combination of one sheet defining a recess and a plurality of sheets defining through-holes to thereby form a deep recess. A plurality of sheets having through-holes may be used for forming a long through-hole. When the first thin plate defines a recess, the second thin plate may be provided as one sheet for blocking the opening side of the recess. When the first thin plate defines a through-hole, the second thin plate needs to be provided as a combination of two sheets for blocking the both opening sides of the through-hole.

The first and second thin plates may be bonded to each other by Surface Activated Bonding. The term "Surface Activated Bonding" means direct bonding of atoms at room temperature. According to the Surface Activated Bonding, a high-precision microstructure less in variations in shape and thickness of the thin plates can be obtained. A metal such as Al, Ni, Cu, etc. or a non-metal such as ceramics, silicon, etc. can be used as the material of each thin plate. Before bonding of the thin plates, the surfaces of the thin plates are preferably irradiated with fast atom beams, ion beams or the like so as to be cleaned. By cleaning, the surfaces are activated to obtain strong bonding.

According to one embodiment of the invention, a microstructure includes a first thin plate and a pair of second thin plates. The first thin plate defines a through-hole. The pair of second thin plates are bonded to respective surfaces of the first thin plate to block openings of the through-hole to thereby form a closed vacuum space or a closed space filled with inert gas.

According to one embodiment of the invention, a microreactor is formed of a plurality of laminated thin plates. The microreactor includes a reaction portion and a closed space. In the reaction portion, a plurality of source fluid react with one another. The closed space has a heat-insulating function or a heat exchanging function. The closed space gives a predetermined reaction environment to the reaction portion.

According to this structure, the temperature of the reaction portion as a specific portion can be controlled because the plurality of source fluid react with one another under the reaction environment given by the closed space.

According to one embodiment of the invention, a micro heat exchanger includes a first thin plate and a second thin plate. The first thin plate defines a recess. The second thin plate is bonded to the first thin plate to block an opening of the recess to thereby form a closed vacuum space or a closed space filled with inert gas.

According to this configuration, when the heat exchange medium is heated, the heat exchange medium is vaporized and moves up in the closed space. Then, heat is radiated to the outside, so that the heat exchange medium is liquefied and moves down in the closed space.

According to one embodiment of the invention, a micro heat exchanger includes a first thin plate and a pair of second thin plates. The first thin plate defines a through-hole. The pair of second thin plates are bonded to respective surfaces of the first thin plate to block openings of the through-hole to thereby form a closed space filled with inert gas.

According to one embodiment of the invention, a method of fabricating a microstructure that includes a closed vacuum space or a closed space filled with inert gas, the method includes forming a first thin plate and a second thin plate on a thin plate-forming substrate, the first thin plate defining a recess; and successively transferring the first and second thin plates from the thin plate-forming substrate to a target substrate in a vacuum or in an inert gas atmosphere while bonding the second thin plate to the first thin plate to block an opening of the recess to thereby form the closed vacuum space or the closed space filled with inert gas.

The plurality of thin plates may be formed by electroforming or may be formed by a semiconductor patterning process. When electroforming is used, a metal substrate is used as a substrate for forming the thin plates. When the semiconductor patterning process, such as photolithography and etching process for making fine patterns for the integrated semiconductor devices, is used, an Si wafer, a glass substrate, a quartz substrate or the like is used as a substrate for forming the thin plates.

According to one embodiment of the invention, a method of fabricating a microstructure that includes a closed vacuum space or a closed space filled with inert gas, the method includes forming a first thin plate and a pair of second thin plates on a thin plate-forming substrate, the first thin plate defining a through-hole; and successively transferring the first thin plate and the second thin plates from the thin plate-forming substrate to a target substrate in a vacuum or in an inert gas atmosphere while bonding the second thin plates to respective surfaces of the first thin plate to block openings of the through-hole to thereby form the closed vacuum space or the closed space filled with inert gas.

According to the invention, a microstructure, a microreactor and a micro heat exchanger can be produced easily, and the temperature of a specific portion can be controlled accurately.

BRIEF DESCRIPTION OF THE DRAWINGS

Embodiments of the invention will be described in detail based on the following figures, wherein.

DETAILED DESCRIPTION OF THE EMBODIMENTS

First Embodiment

Figure 1A:
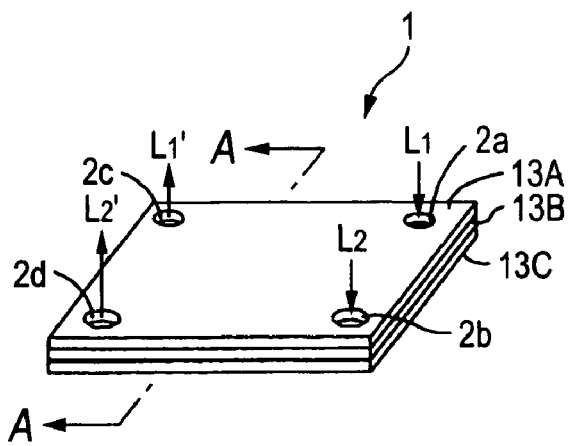
FIG. 1A is a perspective view showing a microreactor according to a first embodiment of the invention.
Figure 1B:
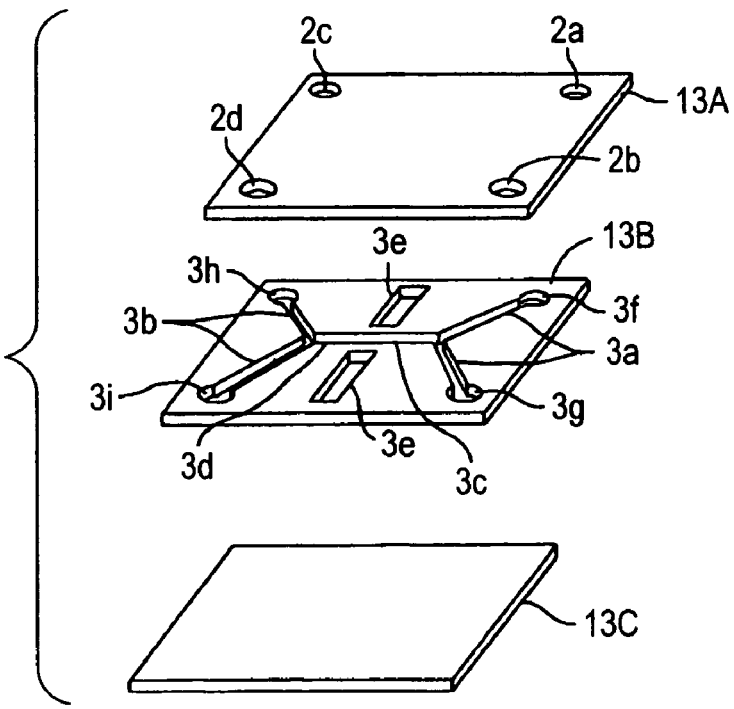
FIG. 1B is an exploded perspective view showing the microreactor.
Figure 1C:
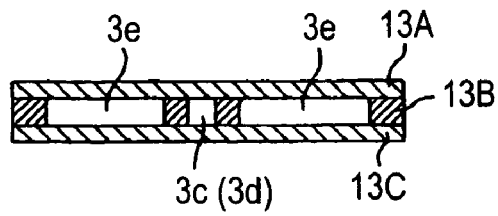
FIG. 1C is a sectional view taken along the line A-A in FIG. 1A.

FIG. 1A is a perspective view showing a microreactor according to a first embodiment of the invention. FIG. 1B is an exploded perspective view showing the microreactor. FIG. 1C is a sectional view taken along the line A-A in FIG. 1A. This microreactor 1 is formed in such a manner that a second pattern layer 13B having a planar channel pattern to react two source fluid $L_1$ and $L_2$ with each other is laminated between a first pattern layer 13A and a third pattern layer 13C.

The first pattern layer 13A defines: first and second inlets 2a and 2b for inlet the two source fluids $L_1$ and $L_2$ in; and first and second outlets 2c and 2d for ejecting reacted fluids $L_1'$ and $L_2'$ obtained by reaction of the two source fluid $L_1$ and $L_2$.

The second pattern layer 13B defines: through-holes 3f to 3i defined so as to correspond to the inlets 2a and 2b and the outlets 2c and 2d; a high-temperature side reaction portion 3c in which the two source fluids $L_1$ and $L_2$ react with each other in a high-temperature region; a low-temperature side reaction portion 3d in which the two source fluids $L_1$ and $L_2$ react with each other in a low-temperature region; channels 3a, which start from the through-holes 3f and 3g, respectively and join to each other at the high-temperature side reaction portion 3c; channels 3b, which start from the low-temperature side reaction portion 3d and branch into the through-holes 3h and 3i; and hollow portions 3e provided as closed spaces for shielding heat conduction between the high-temperature side reaction portion 3c and the low-temperature side reaction portion 3d.

Production Method According to the First Embodiment

Figure 2A:
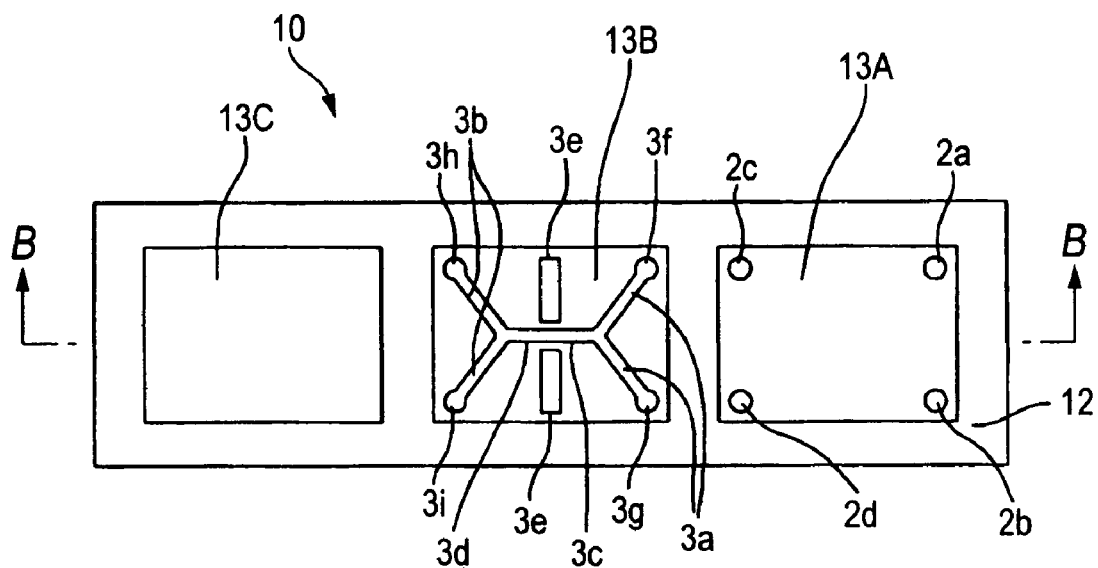
FIG. 2A is a plan view showing a donor board having pattern layers for forming the microreactor depicted in FIGS. 1A to 1C.
Figure 2B:
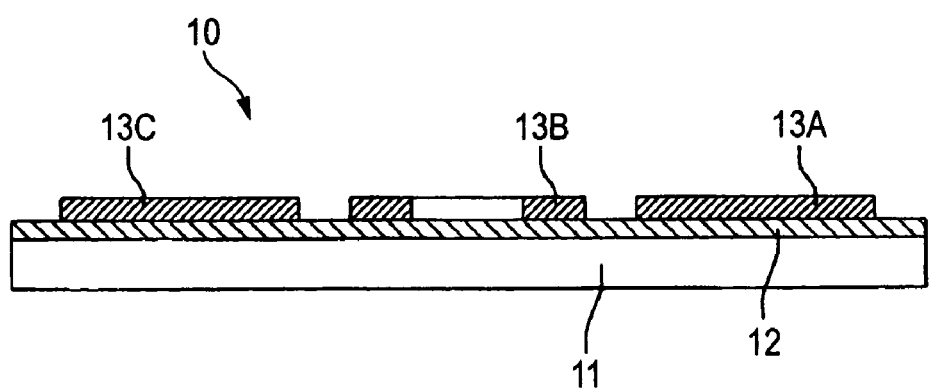
FIG. 2B is a sectional view taken along the line B-B in FIG. 2A.
Figure 3A:
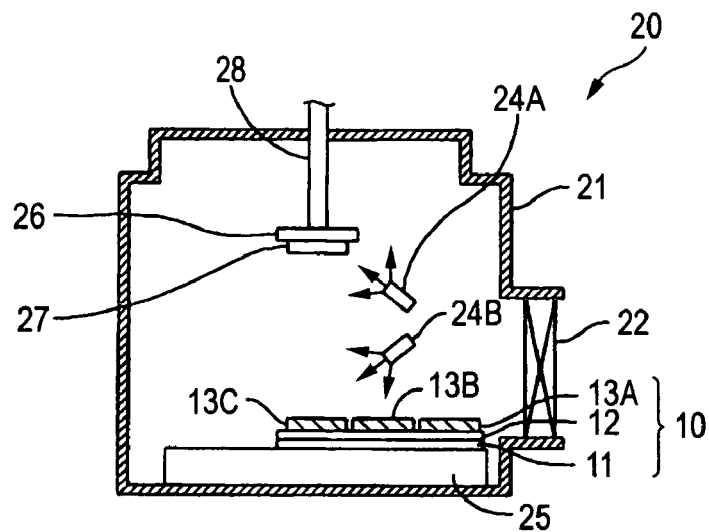
FIGS. 3A to 3C are schematic views showing a transfer process using a bonding apparatus according to the first embodiment of the invention, FIG. 3A being a view showing an FAB processing step, FIG. 3B being a view showing the step of bonding pattern layers, FIG. 3C being a view showing the step of removing the pattern layers.
Figure 3B:
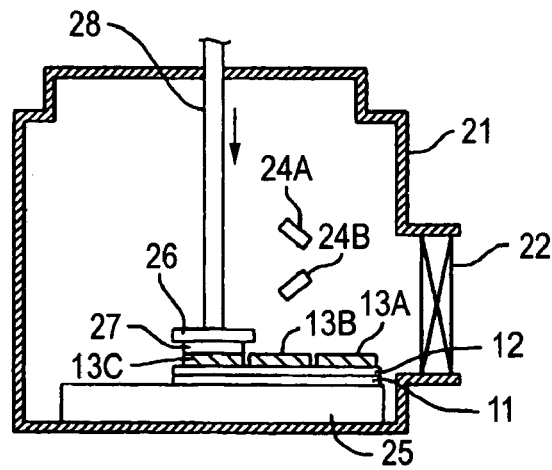
Figure 3C:
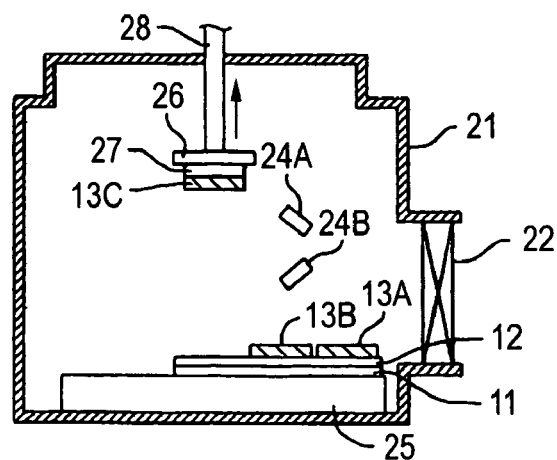

Next, a method for fabricating the microreactor 1 according to the first embodiment will be described with reference to FIGS. 2A and 2B and FIGS. 3A to 3C. FIG. 2A is a plan view showing a donor board having pattern layers forming the microreactor depicted in FIGS. 1A to 1C. FIG. 2B is a sectional view taken along the line B-B in FIG. 2A. FIGS. 3A to 3C are schematic views showing a transfer process using a bonding apparatus. FIG. 3A is a view showing an FAB (Fast Atom Beam) processing step. FIG. 3B is a view showing the step of bonding the pattern layers. FIG. 3C is a view showing the step of removing the pattern layers.

First, the donor board 10 shown in FIGS. 2A and 2B is formed. A Si wafer is prepared as a substrate 11. Polyimide is applied on a surface of the substrate 11 by a spin coating method and baked at a maximum temperature of 350° C. to thereby form a releasable layer 12. Then, a Si thin film serving as a thin plate having a thickness not larger than the order of several microns (rim) is deposited on the releasable layer 12 by a sputtering method. After a photo resist is then applied on a surface of the Si thin film, the Si thin film is etched by ordinary photolithography and patterned into a sectional shape of a target microstructure to thereby obtain the plurality of pattern layers 13A to 13C. After the etching of the Si thin film, the photo resist is removed with a releasing liquid. In this manner, the donor board 10 is produced. The through-holes 3f to 3i, the channels 3a and 3b and the reaction portions 3c and 3d in the second pattern layer 13B are formed by a high aspect ratio etching technique using reactive ion etching (RIE).

Then, the transfer process is carried out. In the transfer process, lamination starts from the third pattern layer 13C, which is the lowermost layer. First, as shown in FIG. 3A, the donor board 10 is fixed to a planar stage 25 in a vacuum chamber 21 while a target board 27 is fixed to a counter stage 26. A vacuum pump not shown is driven to evacuate the vacuum chamber 21 through an air outlet 22 to thereby obtain a vacuum of $10^{-5}$ Pa. Then, FABs (Fast Atom Beam) made of Ar neutral beams emitted from FAB sources 24A and 24B are applied on the target board 27 and the third pattern layer 13C of the donor board 10 respectively to clean their surfaces to thereby activate their surfaces.

Then, as shown in FIG. 3B, while a vertical stage 28 is moved down, the planar stage 25 is moved in x and y directions horizontally and in a θ direction around a z axis vertically to thereby align the target board 27 with the third pattern layer 13C. Incidentally, a goniometer mechanism or a ball joint mechanism can be used as an alignment mechanism.

Then, the target board 27 and the third pattern layer 13C are brought into contact with each other and pressed against each other under a load of 50 kgf/cm² for 5 minutes, so that the target board 27 and the third pattern layer 13C are bonded to each other. The bonding strength on this occasion is from 50 MPa to 100 MPa.

When the vertical stage 28 is then moved up as shown in FIG. 3C, the third pattern layer 13C is transferred onto the target board 27. The reason why the third pattern layer 13C can be transferred thus from the donor board 10 side onto the target board 27 side is that adhesive force between the third pattern layer 13C and the target board 27 is larger than adhesive force between the third pattern layer 13C and the releasable layer 12. Then, the planar stage 25 is moved in order to apply FABs on the second and first pattern layers 13B and 13A. FABs are applied on a rear surface (which was in contact with the releasable layer 12) of the third pattern layer 13C and applied on a front surface of the second pattern layer 13B. After the third pattern layer 13C and the second pattern layer 13B are aligned with each other, the third pattern layer 13C and the second pattern layer 13B are bonded to each other in the aforementioned manner. The same operation as described above is carried out for the first pattern layer 13A which will serve as the uppermost layer. When transferring is performed three times, the microreactor 1 shown in FIGS. 1A to 1C is obtained. The hollow portions 3e are maintained in a vacuum.

Operation of the First Embodiment

Next, the operation of the microreactor 1 according to the first embodiment will be described. When the first source liquid $L_1$ is led in through the first inlet 2a of the first pattern layer 13A while the second source fluid $L_2$ is led in through the second inlet 2b of the first pattern layer 13A, the two source fluids $L_1$ and $L_2$ flow laminarly in the channels 3a, meet with (merge into) each other and move as laminar flows in the high-temperature side reaction portion 3c and the low-temperature side reaction portion 3d. On this occasion, the two source fluids $L_1$ and $L_2$ react with each other at interfaces between the two source fluids $L_1$ and $L_2$. In the high-temperature side reaction portion 3c, the two source fluids $L_1$ and $L_2$ react with each other in a high-temperature region. In the low-temperature side reaction portion 3d, the two source fluids L₁ and L₂ react with each other in a low-temperature region. The high-temperature side reaction portion 3c may be heated by a heater (not shown) from outside of the microreactor 1. Also, the low-temperature side reaction portion 3d may be cooled by a peltiert device (not shown) from outside of the microreactor 1.

Two reacted fluid $L_1'$ and $L_2'$ obtained as products of reaction are separated into two by the channels 3b and ejected from the first and second outlets 2c and 2d respectively. On this occasion, heat conduction between the high-temperature side reaction portion 3c and the low-temperature side reaction portion 3d is shielded by the vacuum hollow portions 3e.

Effects of the First Embodiment

According to the first embodiment as described above, the following effects can be obtained.

(i) Because the plurality of pattern layers 13 are bonded to one another under a vacuum, a microreactor 1 having vacuum hollow portions 3e in its inside can be produced easily.

(ii) Because heat conduction between the high-temperature side reaction portion 3c and the low-temperature side reaction portion 3d is shielded by the hollow portions 3e, high-precision reaction can be performed to obtain desired products.

(iii) Because the pattern layers 13 are transferred under a sufficient load after the pattern layers 13 are cleaned so as to be activated, thin films can be transferred at a high transfer rate.

Second Embodiment

Figure 4A:
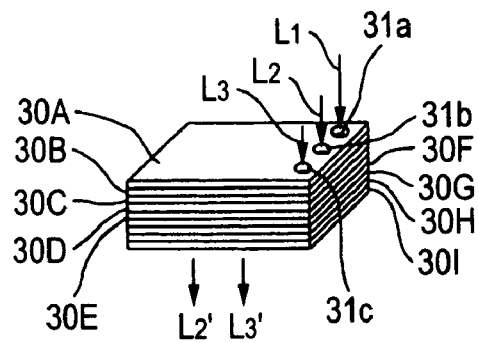
FIG. 4A is a perspective view showing a microreactor according to a second embodiment of the invention.
Figure 4B:
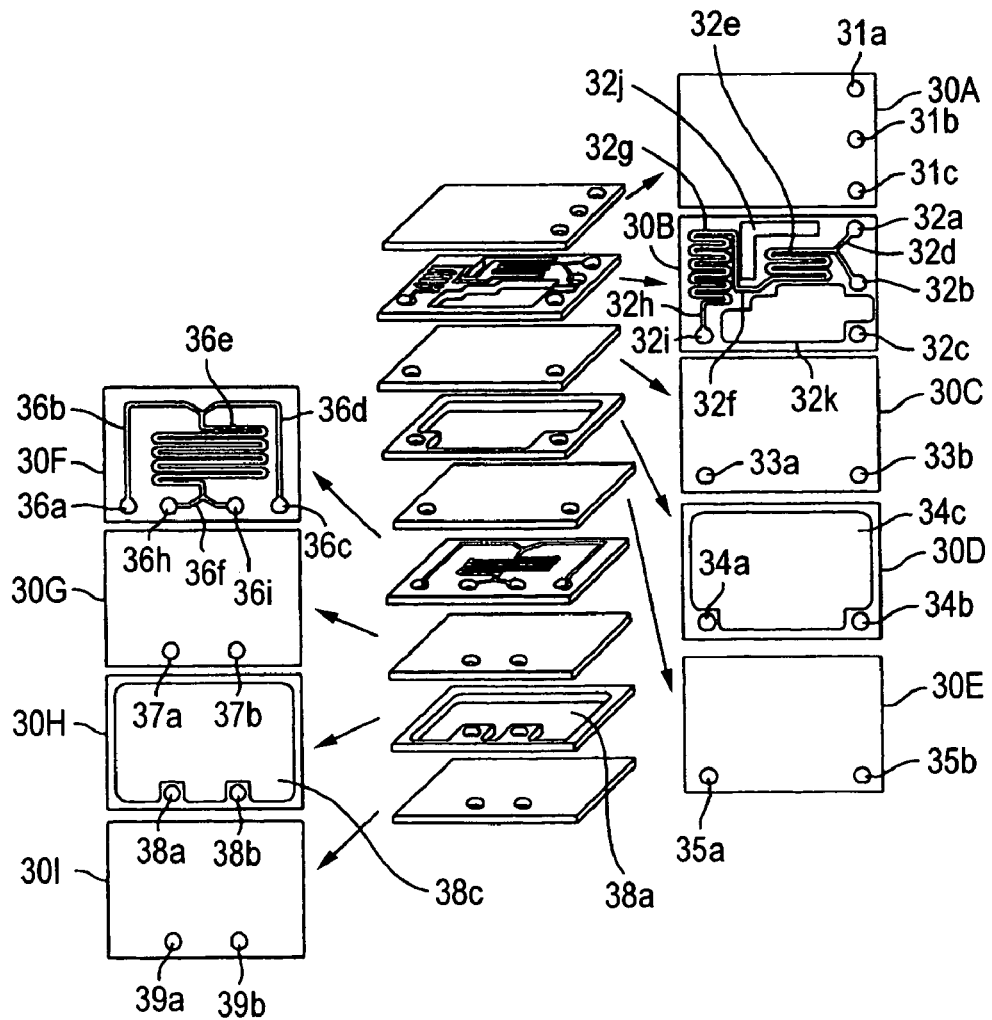
FIG. 4B is an exploded perspective view showing the microreactor.

FIG. 4A is a perspective view showing a microreactor according to a second embodiment of the invention. FIG. 4B is an exploded perspective view showing the microreactor. This microreactor 30 is composed of nine layers including a first pattern layer 30A serving as the uppermost layer to a ninth pattern layer 30I serving as the lowermost layer. The microreactor 30 has: reaction portions 32e and 36e provided in the second and sixth pattern layers 30B and 30F; a heat-insulating portion formed of the third to fifth pattern layers 30C to 30E; and a heat-radiating portion formed of the seventh to ninth pattern layers 30G to 30I.

The first pattern layer 30A defines: a first inlet 31a for inletting a first source fluid L₁ in; a second inlet 31b for inletting a second source fluid L₂ in; and a third inlet 31c for inletting a third source fluid L₃ in.

The second pattern layer 30B defines: first and second inlet-in holes 32a and 32b and a through-hole 32c provided so as to correspond to the first to third inlets 31a to 31c of the first pattern layer 30A; a first reaction portion 32e for reacting the first and second source fluids L₁ and L₂ with each other in a first temperature region; channels 32d, which start from the first and second inlet-in holes 32a and 32b respectively and join to each other at the first reaction portion 32e; a second reaction portion 32g connected to the first reaction portion 32e by a channel 32f, for reacting the first and second source fluids L₁ and L₂ with each other in a second temperature region; an outlet 32i connected to the second reaction portion 32g by a channel 32h, for delivering a reaction liquid as a product of reaction in the second reaction portion 32g to the next process; and hollow portions 32j and 32k provided as closed spaces for shielding heat conduction between the first and second reaction portions 32e and 32g.

The third pattern layer 30C defines: a through-hole 33a serving as a flow path of the reaction liquid produced in the second pattern layer 30B; and a through-hole 33b serving as a flow path of the third source fluid L₃.

The fourth pattern layer 30D defines: through-holes 34a and 34b provided so as to correspond to the through-holes 33a and 33b of the third pattern layer 30C; and a hollow portion 34c provided as a closed space serving as a heat-insulating portion.

The fifth pattern layer 30E defines through-holes 35a and 35b provided so as to correspond to the through-holes 34a and 34b of the fourth pattern layer 30D.

The sixth pattern layer 30F defines: a inlet-in hole 36a for inletting in the reaction liquid produced in the second pattern layer 30B; a channel 36b for the reaction liquid $L_1'$ led into the inlet-in hole 36a; a third inlet-in hole 36c for inletting the third source fluid L₃ in; a channel 36d for the third source fluid L₃; a third reaction portion 36e for reacting the third source fluid L₃ with the reaction liquid $L_1'$ led in; and channels 36f through which the reaction liquid as a product of reaction braches into through-holes 36h and 36i.

The seventh pattern layer 30G defines through-holes 37a and 37b, which serve as flow paths for the reacted fluid. The eighth pattern layer 30H defines: through-holes 38a and 38b, which serve as flow paths for the reacted fluid; and a hollow portion 38c provided as a closed space serving as the heat-radiating portion. The ninth pattern layer 30I defines outlets 39a and 39b from which the reacted fluid $L_2'$ and $L_3'$ exit.

Production Method According to the Second Embodiment

Figure 5A:
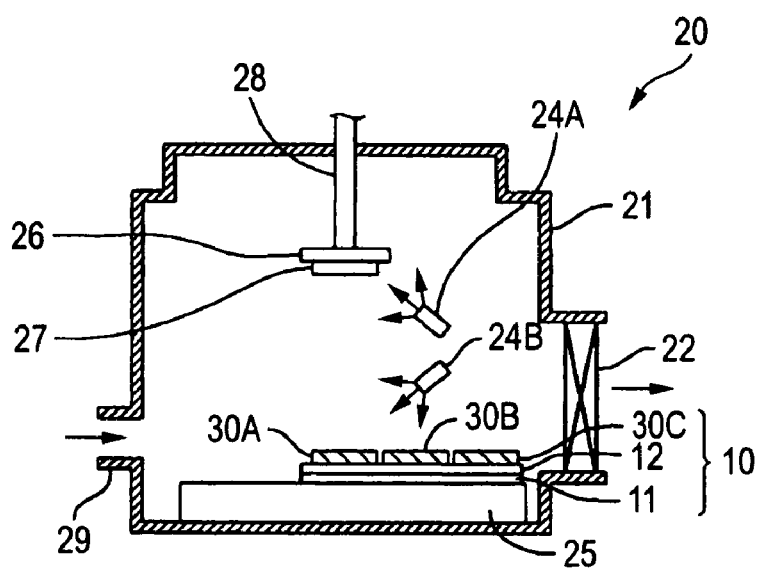
FIGS. 5A to 5C are schematic views showing a transfer process using a bonding apparatus according to the second embodiment of the invention, FIG. 5A being a view showing an FAB processing step, FIG. 5B being a view showing the step of bonding pattern layers, FIG. 5C being a view showing the step of removing the pattern layers.
Figure 5B:
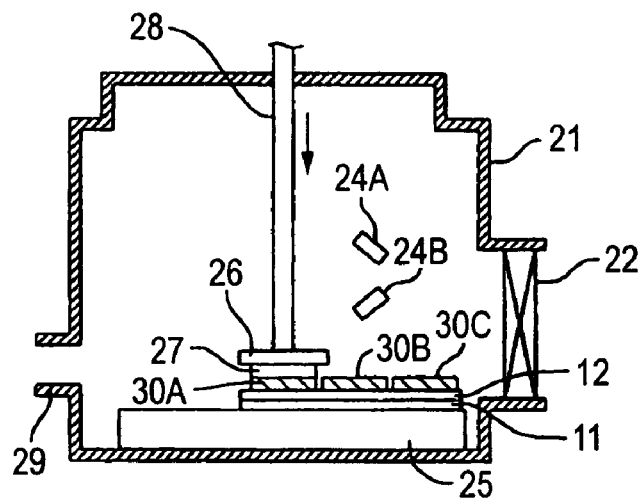
Figure 5C:
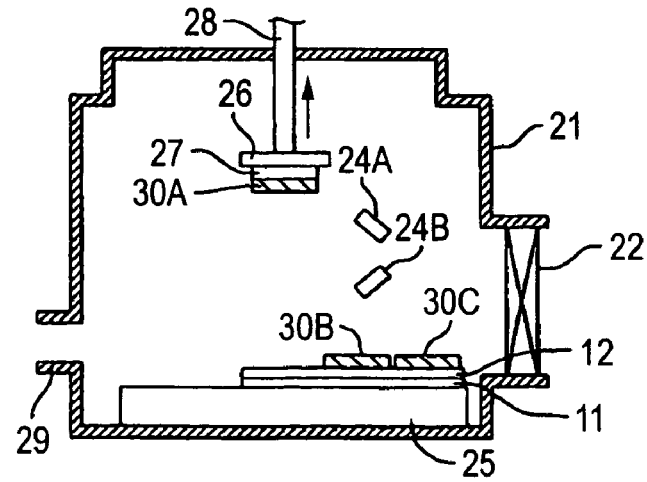

Next, a method for fabricating the microreactor 30 according to the second embodiment will be described with reference to FIGS. 5A to 5C. FIGS. 5A to 5C are schematic views showing a transfer process using a bonding apparatus. FIG. 5A is a view showing an FAB processing step. FIG. 5B is a view showing the step of bonding the pattern layers. FIG. 5C is a view showing the step of removing the pattern layers. Incidentally, only three pattern layers are shown in FIGS. 5A to 5C for the sake of simplification of description.

First, a donor board 10 having a plurality of pattern layers 30A to 30I is prepared in the same manner as in the first embodiment. Then, as shown in FIG. 5A, the donor board 10 is fixed to the planar stage 25 in the vacuum chamber 21 of the bonding apparatus 20 while a target board 27 is fixed to the counter stage 26. The vacuum chamber 21 is evacuated through the air outlet 22 to obtain a vacuum of $10^{-5}$ Pa. Then, FABs made of Ar neutral beams emitted from FAB sources 24A and 24B are applied on the target board 27 and the pattern layers 30A to 30I of the donor board respectively to clean their surfaces to thereby activate their surfaces.

Then, as shown in FIG. 5B, the vertical stage 28 is moved down so that the target board 27 and the first pattern layer 30A are bonded to each other. When the vertical stage 28 is then moved up as shown in FIG. 5C, the first pattern layer 30A is transferred onto the target board 27. The second to eighth pattern layers 30B to 30H are successively bonded onto the first pattern layer 30A in a vacuum in the same manner as described above. For bonding the ninth pattern layer 30I, a cooling medium which is a heat exchange medium such as freon (HFC-134a) is supplied into the vacuum chamber 21 through a gas inlet hole 29 so that the hollow portion 38c of the eighth pattern layer 30H is filled with the cooling medium. After transferring is performed nine times, the target board 27 is finally removed by selective etching or the like. Thus, the microreactor 30 shown in FIG. 4A is obtained.

Incidentally, the transferring may be performed under an atmosphere of inert gas other than the gas used in surface cleaning. In this case, while arbitrary gas is taken in the vacuum chamber 21 through the gas inlet 29 shown in FIGS. 5A to 5C, the vacuum chamber 21 is evacuated through the air outlet 22 by the vacuum pump to thereby adjust the amount of inflow and the amount of displacement to control the atmospheric components and internal pressure of the vacuum chamber 21.

Operation of the Second Embodiment

Next, the operation of the microreactor 30 according to the second embodiment will be described. When the first source fluid $L_1$ is led in through the first inlet 31a of the first pattern layer 30A, the second source fluid $L_2$ is led in through the second inlet 31b of the first pattern layer 30A and the third source fluid $L_3$ is led in through the third inlet 31c of the first pattern layer 30A, the first and second source fluids $L_1$ and $L_2$ pass through the inlet-in holes 32a and 32b and channels 32d of the second pattern layer 30B, react with each other at the first reaction portion 32e in the first temperature region, pass through the channel 32f and react with each other at the second reaction portion 32g in the second temperature region. In the first and second reaction portions 32e and 32g, the reaction is performed in interfaces between the source fluids $L_1$ and $L_2$.

The first reaction liquid $L_1'$ as a product of reaction in the second reaction portion 32g passes through the through-holes 32i, 33a, 34a, 35a and 36a and the channel 36b and flows into the third reaction portion 36e of the sixth pattern layer 30F. On the other hand, the third source fluid $L_3$ led in through the third inlet 31c passes through the through-holes 32c, 33b, 34b, 35b and 36c and the channel 36d and flows into the third reaction portion 36e of the sixth pattern layer 30F.

At the third reaction portion 36e, the first reaction liquid $L_1'$ and the third source fluid $L_3$ react with each other in the third temperature region. The second reacted fluid $L_2'$ and $L_3'$ obtained by this reaction are ejected from the outlets 39a and 39b of the ninth pattern layer 30I through the through-holes 36h, 36i, 38a and 38b.

On this occasion, heat conduction between the first reaction portion 32e and the second reaction portion 32g is shielded because the hollow portions 32j and 32k of the second pattern layer 30B are kept under vacuum. Heat conduction between each of the reaction portions 32e and 32g of the second pattern layer 30B and the third reaction portion 36e of the sixth pattern layer 30F is shielded because the hollow portion 34c of the fourth pattern layer 30D is kept vacuum. Heat is radiated from the third reaction portion 36e of the sixth pattern layer 30F because the hollow portion 38c of the eighth pattern layer 30H is filled with a cooling medium.

Effects of the Second Embodiment

According to the second embodiment as described above, the following effects can be obtained.

(i) Because heat is radiated from the reaction portion 36e by the hollow portion 38c while heat conduction between the respective reaction portions 32e, 32g and 36e is shielded by the hollow portions 32j, 32k and 34c, high-precision reaction can be performed to obtain desired products.

(ii) A three-dimensional microreactor 30 having three reaction portions, a heat-insulating portion and a heat-radiating portion can be produced by a simple operation of laminating a plurality of pattern layers.

(iii) Heat insulation, heat exhaust, heat generation, heat storage, etc. can be performed at option when gases confined in the hollow portions are selected.

Third Embodiment

Figure 6:
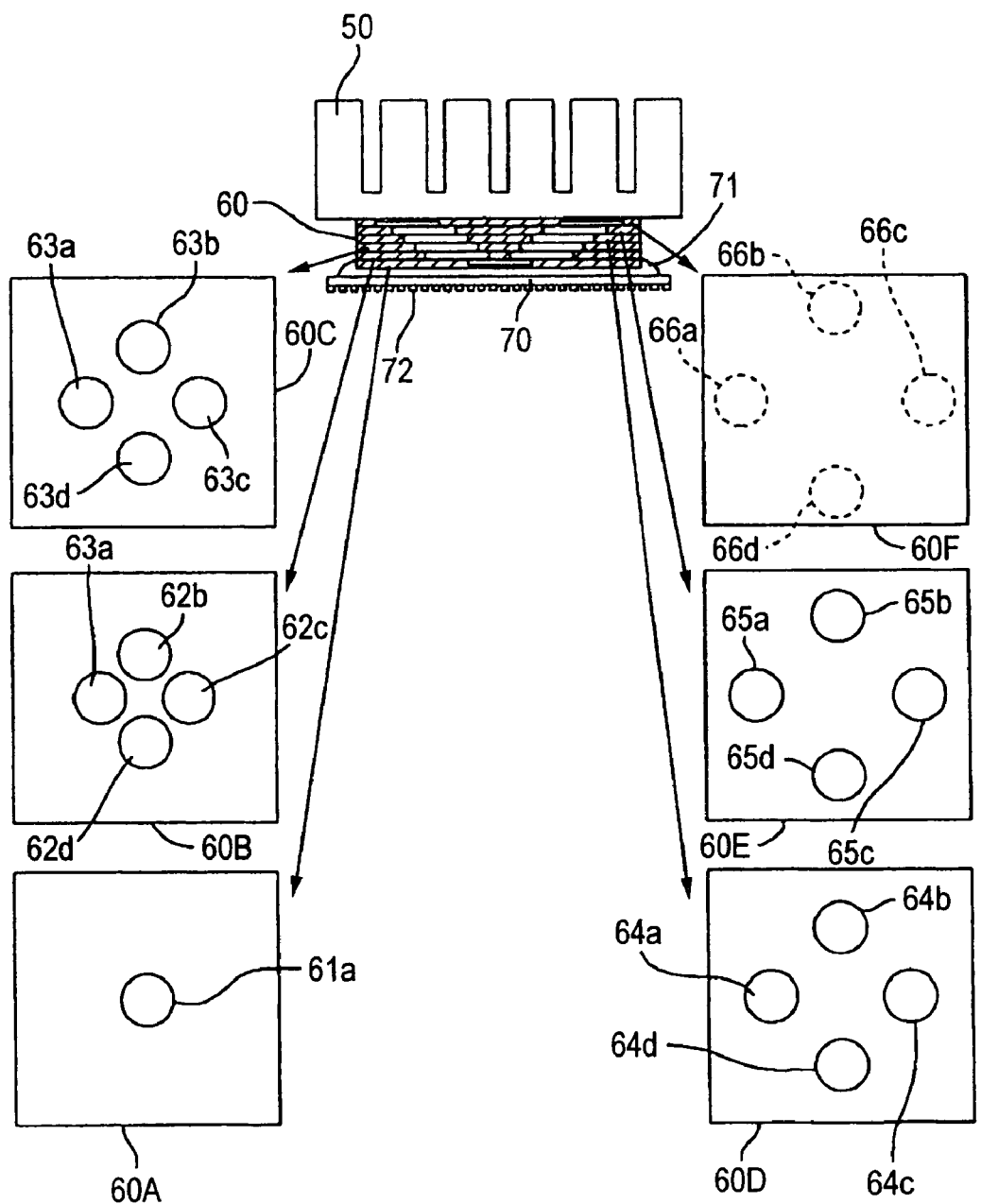
FIG. 6 is a sectional view showing main portions of an IC cooling system to which a micro heat exchanger according to a third embodiment of the invention is applied.

FIG. 6 is a sectional view showing main portions of an IC cooling system to which a micro heat exchanger according to a third embodiment of the invention is applied. This IC cooling system includes: a micro heat exchanger 60 provided on an IC package outer surface 71 of an IC 70 having a plurality of pins 72; and a heat sink 50 provided on an upper surface of the micro heat exchanger 60 for radiating heat from the micro heat exchanger 60 into the air.

For example, the micro heat exchanger 60 is composed of six layers. The first pattern layer 60A defines a recess 61a serving as a cooling medium reservoir for reserving a cooling medium. The second to fifth pattern layers 60B to 60E define through-holes 62a to 62d, 63a to 63d, 64a to 64d and 65a to 65d through which a cooling medium moves. The through-holes 62a to 62d, 63a to 63d, 64a to 64d and 65a to 65d are formed in positions where the through-holes spread gradually radially while partially overlapping with one another vertically. The sixth pattern layer 60F defines recesses 66a to 66d, which are provided in the uppermost portion of the micro heat exchanger 60 and serve as cooling medium reservoirs. Incidentally, the recesses 61a and 66a to 66d and the through-holes 62a to 62d, 63a to 63d, 64a to 64d and 65a to 65d form a closed space.

(Method for Fabricating the Micro Heat Exchanger)

In the micro heat exchanger 60, the pattern layers 60A to 60F are bonded to one another in the same manner as in the first embodiment except that bonding is performed in a freon atmosphere after the respective pattern layers 60A to 60F are formed of a metal (such as Cu) about 15 μm thick. As a result, for example, freon (HFC-134a) with charged pressure of $10^5$ Pa is enclosed in the recesses 61a and 66a to 66d and the through-holes 62a to 62d, 63a to 63d, 64a to 64d and 65a to 65d.

(Operation of the Micro Heat Exchanger)

In this IC cooling system, when heat generated in the IC 70 is transmitted to the first pattern layer 60A, the cooling medium in the cooling medium reservoir 61a is heated and vaporized. As a result, the cooling medium moves up to the cooling medium reservoirs 66a to 66d through the through-holes 62a to 62d, 63a to 63d, 64a to 64d and 65a to 65d. The cooling medium moved to the cooling medium reservoirs 66a to 66d transmits heat to the sixth pattern layer 60F, so that the heat is radiated from the heat sink 50 into the air. On this occasion, the cooling medium in the cooling medium reservoirs 66a to 66d is liquefied and moves down to the cooling medium reservoir 61a through the through-holes 62a to 62d, 63a to 63d, 64a to 64d and 65a to 65d. In this manner, the cooling medium circulates in the closed space while vaporized and liquefied repeatedly.

Effects of the Third Embodiment

According to the third embodiment as described above, the following effects can be obtained.

(i) The micro heat exchanger can be produced by a simple operation of laminating the plurality of pattern layers 60A to 60F in a gas-state cooling medium.

(ii) Because the heat sink 50 is not directly but indirectly attached to the IC 70 through the micro heat exchanger 60, the cooling effect is improved greatly on the basis of the heat exchanging function of the micro heat exchanger 60.

(iii) When the micro heat exchanger 60 is used in a microreactor, the cooling effect can be expected to become higher.

(iv) Because the temperature required for circulation of the cooling medium can be set at option when the kind of the cooling medium is changed, desired temperature control can be performed.

Fourth Embodiment

Figure 7:
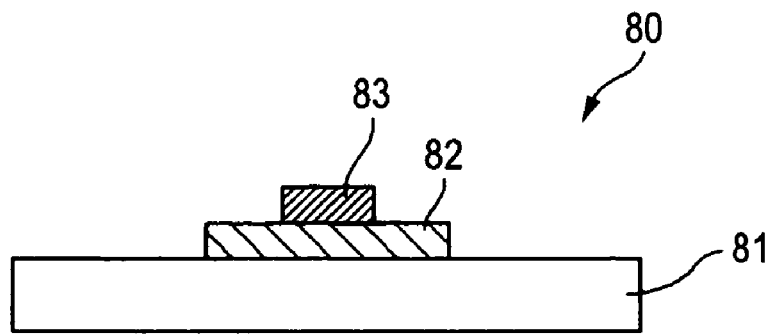
FIG. 7 is a sectional view showing a donor board for fabricating a microstructure according to a fourth embodiment of the invention.
Figure 8:
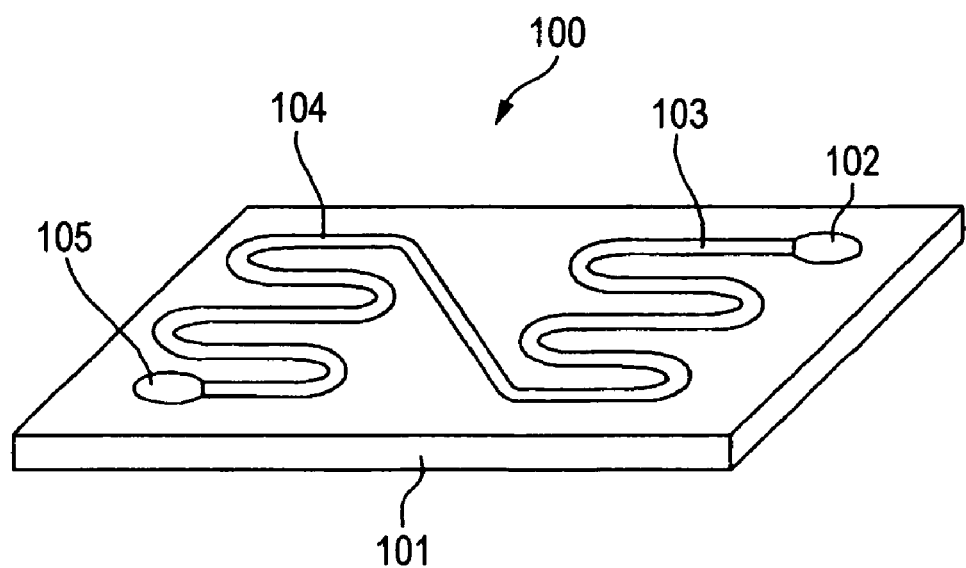
FIG. 8 is a perspective view showing a microreactor according to the related art.

FIG. 7 shows a donor board for fabricating a microstructure according to a fourth embodiment of the invention. The donor board 80 may be shaped like a mesa in advance so that a releasable layer 82 formed on a substrate 81 is slightly larger than a pattern layer 83. According to this configuration, a complex microstructure can be produced while the releasable layer 82 is prevented from coming into contact with the pattern layer 83 when pattern layers are bonded to one another. On the other hand, a structure serving as the first layer in FIGS. 2A and 2B may be formed on a target board by a thin film process or the like before patterns serving as the second layer and layers after the second layer are bonded to the first layer so that a microstructure can be formed while the laminating process is shortened.

Other Embodiments

The invention is not limited to the aforementioned embodiments and various changes may be made without departing from the gist of the invention. For example, constituent members in the respective embodiments may be combined at option without departing from the gist of the invention.

In the transfer process for fabricating the closed space, bonding may be performed not under a vacuum atmosphere but under another gas atmosphere so that another component gas with arbitrary pressure can be enclosed in the closed space. Any gas can be used as the gas enclosed in the closed space as long as the gas is inert to the activated surfaces. Especially, rare gas can be enclosed in the closed space regardless of material because the rare gas is inert to any material. In the case where Ar gas used in a natural atom beam source is enclosed, the natural atom beam source may serve also as a gas inlet so that the gas inlet can be dispensed with.

Each of the target board and the donor board may be shaped like a wafer or a chip. The shape of the target board need not be the same as that of the donor board. The donor board may be provided on the vertical stage side.

Although the aforementioned embodiments have been described on the case where the adhesive force of the pattern layers is adjusted on the donor board side, the adhesive force may be adjusted both on the donor board side and on the target board side or only on the target board side. The electrocasting condition may be controlled so that a donor board having controlled adhesive force can be produced.

What is claimed is:

1. A microstructure comprising:
a reaction portion in which a plurality of source fluids react with one another;
a first thin plate defining a recess; and
a second thin plate bonded to the first thin plate to block an opening of the recess to thereby form a closed vacuum space or a closed space filled with inert gas, wherein the inert gas is a heat exchange medium, which circulates through the closed space, wherein the reaction portion and the closed space are provided on different plates.

2. A microstructure comprising:
a reaction portion in which a plurality of source fluids react with one another;
a first thin plate defining a through-hole; and
a pair of second thin plates bonded to respective surfaces of the first thin plate to block openings of the through-hole to thereby form a closed vacuum space or a closed space filled with inert gas, wherein the inert gas is a heat exchange medium, which circulates through the closed space, wherein the reaction portion and the closed space are provided on different plates.

3. The microstructure according to claim 2, wherein the first and second thin plates are bonded to each other by Surface Activated Bonding.

4. A microreactor formed of a plurality of laminated plates, the microreactor comprising:
a reaction portion in which a plurality of source fluids react with one another; and
a closed space having a heat-insulating function or a heat exchanging function, the closed space giving a predetermined reaction environment to the reaction portion, wherein the reaction portion and the closed space are provided on different plates.

5. The microreactor according to claim 4, wherein:
the reaction portion includes a plurality of reaction portions, which are different from each other in reaction temperature; and
the closed space is held in a vacuum and has the heat-insulating function for shielding heat conduction between the plurality of reaction portions.

6. The microreactor according to claim 5, wherein the plurality of reaction portions and the closed space are formed in one of the thin plates.

7. The microreactor according to claim 5, wherein:
the plurality of reaction portions are provided in different thin plates; and
the closed space is provided in a thin plate located between the thin plates in which the plurality of reaction portions are provided.

8. The microreactor according to claim 4, wherein the closed space is filled with a heat exchange medium circulating through an inside of the closed space and has the heat-exchanging function using the heat exchange medium, for radiating heat from the reaction portion.

9. The microreactor according to claim 4, wherein the closed space is filled with a heat exchange medium circulating through an inside of the closed space and has the heat-exchanging function using the heat exchange medium, for heating the reaction portion.

10. The microreactor according to claim 8, wherein the reaction portion and the closed space are provided in thin plates adjacent to each other.

11. A micro heat exchanger comprising:
a reaction portion in which a plurality of source fluids react with one another;
a first thin plate defining a recess; and
a second thin plate bonded to the first thin plate to block an opening of the recess to thereby form a closed space filled with inert gas, wherein the reaction portion and the closed space are provided on different plates.

12. A micro heat exchanger comprising:
a reaction portion in which a plurality of source fluids react with one another;
a first thin plate defining a through-hole; and
a pair of second thin plates bonded to respective surfaces of the first thin plate to block openings of the through-hole to thereby form a closed space filled with inert gas, wherein the reaction portion and the closed space are provided on different plates.

13. A method of fabricating a microstructure that comprises a closed vacuum space or a closed space filled with inert gas, the method comprising:

forming a reaction portion in which a plurality of source fluids react with one another;

forming a first thin plate and a second thin plate on a plate-forming substrate, the first thin plate defining a recess; and successively transferring the first and second thin plates from the thin plate-forming substrate to a target substrate in a vacuum or in an inert gas atmosphere while bonding the second thin plate to the first thin plate to block an opening of the recess to thereby form the closed vacuum space or the closed space filled with inert gas, wherein the reaction portion and the closed space are provided on different plates.

14. A method of fabricating a microstructure that comprises a closed vacuum space or a closed space filled with inert gas, the method comprising:

forming a reaction portion in which a plurality of source fluids react with one another;

forming a first thin plate and a pair of second thin plates on a thin plate-forming substrate, the first thin plate defining a through-hole; and successively transferring the first thin plate and the second thin plates from the thin plate-forming substrate to a target substrate in a vacuum or in an inert gas atmosphere while bonding the second thin plates to respective surfaces of the first thin plate to block openings of the through-hole to thereby form the closed vacuum space or the closed space filled with inert gas, wherein the reaction portion and the closed space are provided on different plates.

15. The method according to claim 14, wherein the first and second thin plates are formed by electroforming.

16. The method according to claim 14, wherein the first and second thin plates are formed by a semiconductor patterning process.

* * * * *